United States Patent [19]

Andrews et al.

[11] 4,065,441
[45] Dec. 27, 1977

[54] COPOLYAMIDE FROM ARYLENE DIAMINE AND MIXTURE OF ALKYLENE DICARBOXYLIC ACIDS

[75] Inventors: Philip S. Andrews, Hamden; William J. Farrissey, Jr., Northford; Besir K. Onder, North Haven; James N. Tilley, Cheshire, all of Conn.

[73] Assignee: The Upjohn Company, Kalamazoo, Mich.

[21] Appl. No.: 664,763

[22] Filed: Mar. 8, 1976

[51] Int. Cl.$^2$ .............................................. C08G 69/20
[52] U.S. Cl. .................. 260/78 R; 260/30.2; 260/30.6 R; 260/32.6 NA; 260/33.4 P; 260/45.9 NC; 260/47 CZ; 260/47 CB; 260/63 N; 260/65; 260/78 S
[58] Field of Search ....................................... 260/78 R

[56] References Cited

U.S. PATENT DOCUMENTS 2,244,192  6/1941  Flory .................................. 260/78 R Primary Examiner—Harold D. Anderson
Attorney, Agent, or Firm—James S. Rose; Denis A. Firth

[57] ABSTRACT

Novel copolyamides having the recurring unit

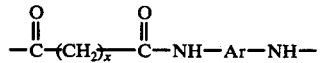

are disclosed wherein $x$, in 50 percent to 85 percent of the recurring units, is an integer from 6 to 10 inclusive, and, in 15 percent to 50 percent of the recurring units is 4, and Ar is an arylene radical. The copolyamides are characterized by ease of melt processing such as in molding, extruding, and injection molding, while at the same time possessing good physical properties, and being further characterized by their ease of conversion from the amorphous to the crystalline state which, in turn, gives rise to a high degree of versatility in their fabrication.

7 Claims, No Drawings

COPOLYAMIDE FROM ARYLENE DIAMINE AND MIXTURE OF ALKYLENE DICARBOXYLIC ACIDS

BACKGROUND OF THE INVENTION

1. Field of the Invention

This invention relates to the preparation of copolyamides and is particularly concerned with aromatic-aliphatic copolyamides.

2. Description of the Prior Art

Various types of polyamide polymers are known to those skilled in the art, see for example The Encyclopedia of Polymer Science and Technology, Vol. 10, pp. 347–593, 1969, Interscience Publishers, New York, N.Y. The various kinds of repeating units disclosed therein which are linked by the carbonamide group

determine the variation in physical properties observed for the different types of polyamides. Physical properties like melting point and solubility are almost solely dependent on the type of repeating unit employed. For example, when all the repeating units are aromatic the polyamide has such a high melting point that melt processability, such as injection molding, is precluded because polymer decomposition begins to occur before the melt stage is ever reached.

Alternatively, when the repeating units are mixed aliphatic-aromatic, as in the case of a polyamide prepared from an aliphatic dicarboxylic acid and an aromatic diamine, the polymer is injection-moldable but, because of high crystallinity, is brittle, opaque, and possessed of low elongation. In fact, when the dicarboxylic acid component is the residue of either adipic, pimelic, or suberic acid and the aromatic diamine is 4,4'-methylenedianitine, the corresponding polyamides have decomposition temperatures below their melting points. This behaviour precludes melt processing these polymers; see J. Polymer Sci. 10, Part A-1, 1547, 1972. Finally, when the repeating units are all aliphatic as in nylon-6,6, the polymer is injection moldable but is limited by the end-use temperature to which it can be exposed.

The prior art discloses methods for the preparation of copolyamides derived from the reaction of mixtures of aliphatic dicarboxylic acids and aromatic diamines, or aromatic diisocyanates in either catalyzed melt condensation, solvent-interfacial condensation, or polar solvent condensation, as set forth in U.S. Pat. Nos. 3,408,334, 3,640,970, and 3,642,715, respectively. Also U.S. Pat. No. 3,651,022 discloses a method for the formation of linear polyamides which are useful for the melt spinning of fibers by reacting 4,4'-methylenedianiline (MDA) with a 1.01 to 1.09 molar excess of a $C_9$–$C_{12}$ aliphatic dicarboxylic acid or mixtures of such acids.

Further, the art teaches that when amorphous, clear, tough moldable polyamides are desired which possess good physical properties, and do not crystallize, then the expensive reduced form of MDA, and its derivatives are to be used. Generally speaking this involves the formation of polyamides from either bis(4-aminocyclohexyl)methane (PACM), or 2,2-bis(4-aminocyclohexyl)propane (PACP) and aliphatic dicarboxylic acids including mixtures thereof; see U.S. Pat. Nos. 2,512,606, 3,703,595, 3,840,501, and 3,842,045.

The prior art does not disclose a polyamide composition which is easily heat processed, for example by molding, extruding, etc., and is amorphous when extruded or worked under one temperature range, or crystalline when extruded or worked under a higher temperature range, and at the same time characterized by good physical properties and higher end-use temperatures as compared with known aliphatic polyamides, and, furthermore, which is easily prepared from readily available and inexpensive starting materials.

The copolyamides prepared in accordance with the present invention meet the above requirements and are set forth in detail hereinbelow.

SUMMARY OF THE INVENTION

This invention comprises a copolyamide having the recurring unit

                          I wherein $x$, in 50 percent to 85 percent of the recurring units, represents an integer from 6 to 10, inclusive, and wherein, in 15 percent to 50 percent of the recurring units, $x$ is 4, and Ar is an arylene radical.

The term "arylene" means a radical obtained by removing two nuclear hydrogen atoms from an aromatic hydrocarbon, and is inclusive of phenylene, tolylene, naphthylene, diphenylene, and divalent radicals having the formula

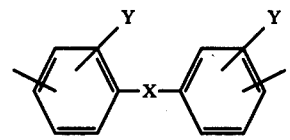

wherein X is selected from the group consisting of —$SO_2$—

—O—, and lower alkylene from $C_1$ to $C_4$; and Y is selected from the group consisting of hydrogen, lower alkyl from $C_1$ to $C_4$, lower alkoxy from $C_1$ to $C_4$, and halogen; and further provided that the valencies of the arylene radicals are in the para, or meta configuration, when said valencies are on the same aromatic ring, and in the para, para', or the meta, meta' configuration when said valencies are on different aromatic rings; and mixtures of the above arylene radicals.

The term "lower alkylene from $C_1$ to $C_4$" means alkylene having from 1 to 4 carbon atoms, inclusive, such as methylene, ethylene, propylene, butylene, and isomeric forms thereof.

The term "lower alkyl from $C_1$ to $C_4$" means alkyl having from 1 to 4 carbon atoms, inclusive, such as methyl, ethyl, propyl, butyl, and isomeric forms thereof.

The term "lower alkoxy from $C_1$ to $C_4$" means alkoxy having from 1 to 4 carbon atoms, inclusive, such as methoxy, ethoxy, propoxy, butoxy, and isomeric forms thereof.

DETAILED DESCRIPTION OF THE INVENTION

It is an object of the present invention to provide copolyamides that are characterized by ease of melt processability and at the same time can withstand high end-use temperatures in comparison to aliphatic polyamides well known in the art. It is a further object of the present invention to provide copolyamides that are characterized by a range of physical properties of sufficiently high caliber to enable the polymers to be useful as engineering thermoplastic materials.

The foregoing objects and others are accomplished by providing a copolyamide comprised of the recurring unit (I) set forth hereinabove. The proportion of the recurring units wherein $x$ represents an integer from 6 to 10, inclusive, is advantageously from 50 percent to 85 percent, and preferably from about 70 percent to about 80 percent. Correspondingly, the proportion of the recurring units wherein $x$ is 4 is advantageously from 15 percent to 50 percent, and preferably from about 20 percent to about 30 percent. A most preferred combination is that wherein $x$ represents an integer from 6 to 10, inclusive, in about 75 percent of the recurring units and, in the remaining 25 percent of the recurring units, $x$ is 4.

This range for $x$ of from 50 percent to 85 percent wherein $x$ is an integer of from 6 to 10 inclusive, and 15 to 50 percent wherein $x$ is 4, is characteristic of the copolyamides of the present invention. If the content of the recurring units wherein $x$ is 4 is above 50 percent the processing of the copolyamides becomes increasingly difficult due to the decomposition temperatures of the copolyamids occurring below their melting points. Conversely, if the content of the recurring units wherein $x$ is an integer from 6 to 10, inclusive, is above 85 percent the resulting copolyamides, while extrudable, have poor polymer properties which approach those of the homopolymers because of high crystallinity and are therefore brittle, opaque, and possessed of low elongation.

Contrastingly, when the copolyamides are within the specific ranges called for by the present invention they accomplish the foregoing objects, and additionally give rise to certain unexpected results which will be disussed in detail hereinafter.

The value of $x$ in the polymethylene unit $-(CH_2)_x-$ in 50 percent to 85 precent of the recurring units is advantageously from 6 to 10, inclusive, and preferably is from 6 to 8, inclusive, and most preferably the value of $x$ is 7.

The radical Ar is an arylene radical having the definition set forth above and illustratively includes m-phenylene, p-phenylene, 2,4-tolylene, 2,6-tolylene, and mixtures of 2,4-, and 2,6-tolylene, 1,5-naphthylene, 4,4'-biphenylene, 4,4'-oxydiphenylene, 4,4'-sulfonyldiphenylene, 4,4'-carbonyldiphenylene, 4,4'-isopropylidenediphenylene, 4,4'-methylenediphenylene, 3,3'-dimethyl-4,4'-methylene-diphenylene, 3,3'-methylenediphenylene, and the like, and mixtures thereof. A preferred Ar radical is 4,4'-methylenediphenylene.

The valencies of the arylene radicals are in the para or meta configuration when said valencies are on the same aromatic ring, and in the para, para' or meta, meta' when said valencies are on different aromatic rings, otherwise the polymer chains cannot pack properly which has a detrimental effect on polymer physical properties.

Combinations of arylene radicals are contemplated by the teaching of the present invention and a preferred combination comprises mixtures of 4,4'-methylenediphenylene with a member selected from the group consisting of 2,4-tolylene, 2,6-tolylene, and mixtures thereof.

The copolyamides in accordance with the present invention are characterized by ease of melt processing because of reduced polymer crystallinity. For example, molding, extrusion, and injection molding are possible with the absence of polymer degradation. Yet at the same time the polymers have sufficient aromatic content to give rise to high polymer glass transition temperatures and thereby good high temperature polymer stability (such as heat deflection temperatures).

Additionally, the copolyamides are considered to be random polymers, in contrast to block polymers, and capable of being formed into tough amorphous, or crystalline articles. This gives rise to the added advantage of good polymer transparency and good overall physical properties such as tensile strength, impact strength, and elongation.

Also, in spite of the aromatic content, the copolyamides have good solubility in those solvents normally employed for polyamides. Illustrative of such solvents are the phenolic solvents such as meta-cresol, cresylic acid, and the like; polar liquids such as linear or cyclic amides or phosphoramides, for example, N,N-dimethylformamide, N,N-dimethylacetamide, N-methylpyrrolidone, tetramethylenesulfone, and the like. This allows the copolyamides of the present invention to be used in those applications calling for solutions such as in the preparation of films, coatings, lamination, and the like.

Surprisingly, the morphology of the copolyamides of the present invention can be easily controlled to provide amorphous, or crystalline polymer products. To obtain the copolyamides in the amorphous state they are simply molded at temperatures of from about 140° C to about 155° C, or else extruded or injection molded into normal room temperature conditions, or into cold molds, or any type of shock-cooling process. To obtain the copolyamides in the crystalline state they are molded at temperatures of from about 180° C to about 200° C, or else extruded or injection molded slowly, or into heated molds. It will be apparent to those skilled in the art that these characteristics give rise to a high degree of versatility in the fabrication of these copolyamides.

In an unexpected advantage to flow from the copolyamides of the present invention, they are easily prepared and processed directly from the melt which obviates the added cost and complications inherent in other procedures.

The copolyamides having the recurring unit (I) are easily prepared by methods well known to those skilled in the polymer art. For example, a convenient procedure is the melt condensation process set forth in U.S. Pat. No. 3,408,334, whose disclosure is hereby incorporated by reference. A mixture of aliphatic dicarboxylic acids (II) wherein from about 15 mole percent to about 50 mole percent of the mixture is adipic acid and about 50 mole percent to about 85 mole percent of the mixture is a dicarboxylic acid (II) having the value of $x$ defined hereinabove, and an aromatic diamine (III) wherein Ar is defined as above

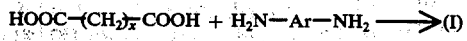

are reacted to form the polymer (I).

Another convenient process is the solution technique of U.S. Pat. No. 3,640,970, whose disclosure is hereby incorporated by reference, wherein the diacid halides corresponding to the diacids (II) are reacted with (III) in solution to form (I). And yet another convenient process is that set forth in U.S. Pat. No. 3,642,715, whose disclosure is hereby incorporated by reference, wherein the diisocyanate corresponding to (III) is reacted in solution with the mixture of acids (II) to form the copolyamides (I) of the present invention.

When the acid chloride process is employed to prepare the copolyamides of the present invention it is advantageous to employ a polymer chain capping agent to assist in polymer stabilization and molecular weight reproducibility. Suitable capping agents are mono acid chlorides, as, for example, benzoyl chloride, or palmitoyl chloride, and the like. The capping agent is employed in excess over the equivalent stoichiometric acid chloride content in a range of from about 0.25 equivalent percent to about 1.0 equivalent percent.

When the melt condensation technique is employed it is usually advantageous to have a 0.5 to 1.5% molar excess of one of the dicarboxylic acids over the arylene diamine.

Yields of the copolyamides from all the processes set forth above are normally as high as 99%. Polymer molecular weight is characterized by an inherent viscosity of at least 0.5 when determined at 30° C in m-cresol at 0.5% concentration.

And further, the copolyamides of the invention are characterized by $\overline{M}_n$ molecular weights of from about 10,000 to about 50,000.

Generally speaking, the use of a polymerization catalyst is advantageous and a preferred group of catalysts for the polymerization of diisocyanate and dicarboxylic acids is the N-alkali metal lactamates such as potassium propiolactamate, potassium pyrrolidone, sodium caprolactamate, and the like, and the alkali metal alkali metal alkoxides, such as sodium methoxide, sodium ethoxide, sodium phenoxide, and the like, disclosed in copending applications Ser. No. 521,745 filed Nov. 7, 1974, now U.S. Pat. No. 4,021,412 and Ser. No. 521,744 filed Nov. 7, 1974 now U.S. Pat. No. 4,001,186 respectively.

Illustrative of the diacids (II) (or the corresponding diacid chlorides thereof) useful in the present invention are adipic acid (adipoyl chloride), suberic acid (suberoyl chloride), azelaic acid (azelaoyl chloride), sebacic acid (sebacoyl chloride), undecanedioic acid (undecanedioyl chloride), and dodecanedioic acid (dodecanedioyl chloride).

Copolyamides within the scope of the present invention include those in which minor amounts of up to about 10% of the recurring units are different from those set forth above, and include recurring units that are derived from an aliphatic, aromatic, or alicyclic dicarboxylic acid other than those set forth above. Illustratively, this includes terephthalic acid, 5-nitroisophthalic acid, 4,4'-benzophenonedicarboxylic acid, 4,4'-dicarboxydiphenyl ether, and the like, malonic acid, succinic acid, glutaric acid, 1,4-cyclohexanedicarboxylic acid, and the like.

Illustrative of the diamines (III) (or the corresponding diisocyanates thereof) useful in the present invention are, m-phenylenediamine (m-phenylenediisocyanate), p-phenylenediamine (p-phenylenediisocyanate), 2,4-tolylenediamine (2,4-tolylenediisocyanate), 2,6-tolylenediamine (2,6-tolylenediisocyanate), and mixtures of the 2,4- and 2,6-tolylene diamine (and the diisocyanates thereof), 1,5-naphthylenediamine (1,5-naphthylenediisocyanate), 4,4'-diaminobiphenyl (4,4'-diisocyanatobiphenyl), 4,4'-diaminodiphenylether (4,4'-diisocyanatodiphenylether), 2,2'(4,4'-diaminodiphenyl)-propane [2,2'(4,4'-diisocyanatodiphenyl)propane], 4,4':diaminobenzophenone (4,4'-diisocyanatobenzophenone), 4,4'-diaminodiphenylmethane (4,4'-diisocyanatodiphenylmethane), 3,3'dimethyl-4,4'-diaminodiphenylmethane (3,3'-dimethyl-4,4'-diisocyanatodiphenylmethane), 3,3'-diaminodiphenylmethane (3,3'-diisocyanatodiphenylmethane), and the like, and mixtures thereof.

Additives such as antioxidants, dyes, fire retardants, and the like may be added to solutions of the polymers of the present invention in solvents of the type set forth above. Alternatively the additives may be added to the dry powdered polymers either prior to, or during, processing steps such as molding, extruding, injection molding and the like.

Furthermore, reinforced articles prepared from the copolyamides of the present invention are readily prepared by the inclusion of fibrous reinforcing agents during the molding operations using methods well known to those skilled in the art; see The Encyclopedia of Polymer Science and Technology, Vol. 12, pp. 31–55, 1970, Interscience Publishers, New York, N. Y. Exemplary reinforcing agents are glass fibers, asbestos fibers, organic fibers, and the like. Any suitable reinforcing agent known to those skilled in the art can also be used.

The copolyamides prepared in accordance with the present invention can be used as molding powders, for the preparation of fibers and coatings from solution, for injection molding of articles, and the like. The solid polymers so obtained can be used in bushings, seal faces, electric insulators, compressor vanes and impellers, pistons and piston rings, gears, thread guides, cams, brake lining, clutch faces, abrasive articles. Further, coatings of the copolyamides of the present invention are useful in wire coating, in casting films, or spraying polymer films on a variety of substrates such as metal, ceramic, fabrics, polymerics, and the like.

The following examples describe the manner and process of making and using the invention and set forth the best mode contemplated by the inventors of carrying out the invention but are not to be construed as limiting.

EXAMPLE 1

A 1000 ml. resin flask was equipped with a stainless steel motor driven stirrer, a nitrogen inlet tube, and a side-arm distillation condenser leading to a 250 ml collection flask. The system was flamed out under vacuum and flushed several times with dry $N_2$. The flask was charged with a preblended mixture consisting of 176.46 g. (0.9375 mole) of azelaic acid (recrystallized 3x from chloroform), 47.50 g. (0.325 mole) of adipic acid (99% + purity), 247.50 g. (1.25 moles) of 4,4'-methylenedianiline (recrystallized 2x from hot benzene under $N_2$), and 2.13 g. of N,N' -bis [3-(3',5'-di-t-butyl-4'-hydroxyphenyl)propionyl] hexamethylenediamine (Irganox-1098, an antioxidant supplied by Ciba-Geigy Corp., Ardsley, N. Y.). The mole ratio of dicarboxylic acids to the diamine represented a 1% excess.

The resin flask was lowered into an oil bath at 250° C and stirring of its contents begun at a low rate of about 4 r.p.m., under $N_2$ while at the same time the oil bath temperature was slowly raised. After about 13 minutes, the reactants were completely melted and beginning to react. Thereafter the temperature of the bath was controlled to about 288° and stirring increased to 20 r.p.m. Over 2½ hours reactant viscosity increased which was reflected in the stirrer r.p.m. dropping to 10. Vacuum was applied (1.3 mm Hg) with a nitrogen bleed while liquid condensate collected in the collection flask. Vacuum and stirring were maintained for 1¾ hours at a bath temperature of about 290° C.

The vacuum was released and the very viscous reaction mixture maintained under $N_2$ while the oil bath was allowed to cool slowly. At about 210° C, crystallization of the flask contents began. The collection flask contained 42.25 g. of water (Theory: 45.0 g.). When the temperature had cooled to about 150° C, the resin flask was removed from the oil bath, cooled, and the contents provided 413 g. of product. It was ground to a particle size of about 2 mm in a Wiley mill and was characterized by: an ηinh at 30° C (0.5% in m-cresol) = 0.75; and a Tg = 110 ° C followed by a double melting at 236° C and 252° C as determined by DTA (differential thermal analysis) using a DuPont 900 Thermal Analyzer instrument, under $N_2$ at a rate of 20 deg./min., and corresponded to the following structure

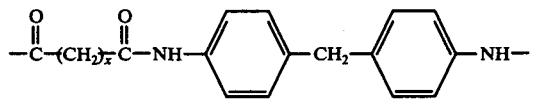

wherein x in 75 percent of the recurring units is 7 and in the remaining 25 percent is 4.

The powdered copolyamide was then extruded into smooth rods using a Brabender Plasti-Corder (Brabender Instruments, Inc., South Hackensack, N. J.). Extrusion conditions were as follows, screw speed = 40 r.p.m.; die size ¼ inches diameter; and reverse temperature conditions which ranged from 270° C in the first zone to 220° C in the extruder nozzle. The clear transparent amorphous polymer was then simply molded under one of the three different sets of conditions set forth below to provide: (a) amorphous, (b) amorphousannealed, and (c) crystalline copolyamides in accordance with the present invention.

EXAMPLE 1 (a)

Amorphous Polymer

A series of test bars were prepared by placing a 5 inch length of the extruded rod (about 10 g.) in an ASTM ½ inch × 5 inch bar mold preheated to 150° C and compression molding the sample at 150° – 155° C under about 4000 psi and thereafter allowing the mold to cool to about 90° C over a period of about 1 hour to about 1½ hours, or force cooling, by using a fan and cooling to the same temperature over about 45 – 50 minutes. The bars were demolded and were characterized by the average physical properties set forth in Table I under 1a. The heat deflection data (HDT) set forth in Table I under 1a was determined on four different test bars starting with the first molded at 150° C in accordance with the conditions set forth above for obtaining amorphous polymer. The second, third, and fourth bars were obtained by taking three bars already molded at 150° C and remolding them at 160°, 170°, and 180° respectively. The increase in HDT from 124° C to 145° C is due to the copolyamide being converted from an amorphous polymer in the first bar, to a crystalline material in the fourth bar.

EXAMPLE 1 (b)

Amorphous-Annealed Polymer

Test bars prepared in accordance with the procedure described in (a) above were annealed by storage in an oven at 102° C over a period of 24 hours and were characterized by the average physical properties set forth in Table I under 1b.

EXAMPLE 1 (c)

Crystalline Polymer

Test bars prepared in accordance with the procedure described in (a) above were remolded in the ASTM ½ inch × 5 inch mold at 180° C and 4000 psi. They were allowed to cool and after 1 hour and 10 minutes, at about 110° C, were demolded and were now completely opaque whereas originally they were clear to translucent. The crystalline bars were characterized by the average physical properties set forth in Table I under 1c.

TABLE I

| Property | 1a | 1b | 1c |
| --- | --- | --- | --- |
| Tensile str. at yield (psi) | 3770 | 4040 | 1970 |
| Tensile mod. (psi) | 138,900 | 160,800 | 200,000 |
| Elongation (%) | 3.02 | 3.15 | 1.1 |
| Izod unnotched[1] impact str. (ft.lbs./in.) | 3.24 | 3.2 | 1.4 |
| Gehman[2] Tg° C | 120 | | 207 |
| DTA[3] Tg° C | 115 | | |
| Heat deflection temp.[4] at 264 psi: | | | |
| bar molded at 150° C | 124° C | | |
| bar molded at 160° C | 120° C | | |
| bar molded at 170° C | 144° C | | |
| bar molded at 180° C | 145° C | | |

[1]ASTM Test Method D256-56
[2]Glass transition temp. determined using the procedure of ASTMD-1053-58T on a modified Gehman Torsion Stiffness Tester, fitted with a heavy duty furnace to allow operation up to 500° C.
[3]Glass transition temp. determined by differential thermal analysis using a Dupont 900 Thermal Analyzer DTA.
[4]ASTM Test Method D648-56.

EXAMPLE 2

A 2000 ml. resin flask equipped with a mechanical stirrer, thermometer, addition funnel, a nitrogen inlet tube, and a reflux condenser was flamed under a flow of nitrogen to exclude moisture. The flask was charged with a solution of 158.63 g. (0.8 mole) of distilled 4,4'-methylenedianiline (b.p. at 1.5 mm Hg = 200° C) dissolved in 425 g. of dimethylacetamide followed by an additional 477 g. of dimethylacetamide rinse. The flask and contents were cooled to −20° C using an isopropanol-acetone bath.

A mixture of 36.61 g. (0.2 mole) of pure adipoyl chloride and 135.08 g. (0.6 mole) of pure azelaoyl chloride was charged to the addition funnel. The mixture was added to the flask, under nitrogen, over a period of 11 minutes which caused the temperature to rise to 0° C. A 205 g. rinse sample of dimethylacetamide was added through the addition funnel and stirring continued for about 10 minutes during which time the temperature went down to −15° C. The cooling bath was removed and stirring continued over about 2 ½ hours as the viscosity of the reaction solution increased. An additional 448.6 g. of dimethylacetamide was added which resulted in the viscous solution having a solid content of about 15%. After a further 1½ hours, the stirrer was stopped.

The DMAc. HCl salt was neutralized by the addition of 59.28 g. (0.8 mole) of calcium hydroxide. Also 1.65 g. of Irganox-1098 was added. A nearly clear viscous solution resulted after the reaction mixture had been stirred for 3 - 4 hours.

The polymer was precipitated by pouring the viscous solution into 2½ gallons of water. The resulting polymer rope was chopped in a Waring blendor with more water, allowed to stand overnight, then filtered. The chopped polymer was dried overnight in large trays at 100° C in a circulating air oven. Final drying was accomplished in a vacuum oven for 3 hours at 100° C, 2 hours at 120° C, and finally 150° −155° C overnight.

A thermal gravimetric analysis (TGA) showed the polymer to be free of volatiles. It was characterized by a $\eta$inh at 30° C(0.5% in m-cresol) = 2.48, and corresponded to the following structure

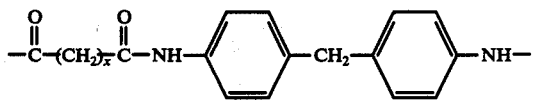

wherein $x$ in 75 percent of the recurring units is 7 and in the remaining 25 percent is 4.

The powdered copolyamide was extruded into translucent rods using the Bradbender equipment and procedure outlined in Example 1 except that the temperature conditions went from 290° C in zone #1 to 250° C in zone #4.

Test bars were molded under the conditions set forth under Example 1a above and the amorphous ½inch × 5 inch bars were annealed at 100° C for 24 hours. The average physical properties for the amorphous-annealed bars are set forth in Table II under 2(a).

Test bars were produced in the crystalline state by remolding bars that had been prepared in accordance with 2(a) above, at 185° - 190° C under 4000 psi, cooling slowly and annealed at 100° C for 24 hours. The average physical properties for the crystalline polymer are set forth in Table II under 2(b).

A mil thick film was prepared from the DMAc solution of the copolyamide by casting a layer of the solution on a glass plate using a doctor knife (set at 16 mils) and drying the layer at 82° C for 4 hours and overnight at 100° C under $N_2$. The resulting clear film was removed from the glass plate, placed in metal frame, and washed 24 hours with a constant flow of warm water. The film was wiped dry and cured at 140° - 145° C in a vacuum oven for 4 hours. The film had the properties set forth in Table II under 2(c).

TABLE II

| Property | 2a | 2b | 2c |
|---|---|---|---|
| Tensile str. at yield (psi) | 4290 | 5730 | 10,500 |
| Tensile mod. (psi) | 114,500 | 211,800 | 298,000 |
| Elongation, % | 4.7 | 3.1 | 31.0 |
| Izod, unnotched ft.-lbs./in. | | 5.4 | 4.5 |
| HDT ° C | | 147 | 151 |

EXAMPLE 3

A series of five polymerization (Run 3a to 3e) were carried out on a 0.020 mole scale using the following procedure and apparatus. Run 3c and 3d were prepared in accordance with the present invention while Run 3a, 3b, and 3e were not so prepared.

A dried 100 ml. semi-micro resin flask equipped with a stirrer, reflux condenser, thermometer, nitrogen inlet tube, and rubber septum was charged with 3.9654 g. (0.020 mole) of 4,4'-methylenedianiline dissolved in 30 ml. of N-methylpyrrolidone (NMP). Under a constant flow of nitrogen and cooling, 0.020mole of the corresponding acid chlorides set forth in Table III, under 3(a) to 3(e), were added from a syringe to the flask at a temperature of 5° - 10° C over a 10 minute period. The reaction mixture was stirred at 10° - 22° C for about 50 minutes during which time it became viscous. Heat was applied and stirring continued at about 30° - 40° C for 45 minutes. A solution of 0.070 g. of aniline in 10 ml. of NMP was addded to the reaction mass to cap off any polymer chains having free acid chloride end groups. The mixture was stirred for a further 10 minute period.

The polymer was precipitated by adding to water, collecting the fibrous solid and washing it first with 4.96 g. of sodium carbonate dissolved in 400 ml. of water, followed by 2 more water washes. It was then washed in 2×350 ml. of methanol in a Waring blendor, collected, and dried overnight in a vacuum oven at 60° C.

Thus there were obtained five polyamides having the recurring unit

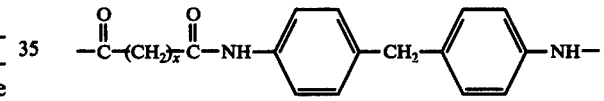

Their respective $\eta$inh values determined at 30° C in0.5% conc. $H_2SO_4$ are set forth in Table III along with the acid chlorides used in the preparation and their corresponding values for $x$ in the formula set forth above.

TABLE III

| | Adipoyl chloride (moles) Azelaoyl chloride (moles) | Value of x in the % of the recurring unit | $\eta$inh |
|---|---|---|---|
| 3a | 0.020/0 | 100% = 4 | 0.84 |
| 3b | 0.015/0.005 | 75% = 4 | |
| | | 25% = 7 | 0.55 |
| 3c | 0.010/0.010 | 50% = 4 | |
| | | 50% = 7 | 0.99 |
| 3d | 0.005/0.015 | 25% = 4 | |
| | | 75% = 7 | 0.65 |
| 3e | 0/0.020 | 100% = 7 | 0.85 |

Approximately 0.75 g. samples of each one of the polymers was molded in a small bar mold measuring 5 mm wide by 7.5 cm long at a mold temperature of about 263° C to 298° C and under a pressure of 8,000 to 60,000 psi.

The molded polymers were subjected to thermal gravimetric analysis (TGA), and differential thermal analysis (DTA) using a Dupont 900 Thermal Analyzer instrument, and their shear modulus measured at elevated temperatures by the Gehman method of ASTM D1053-58T on a modified Gehman Torsion Stiffness Tester fitted with a heavy duty furnace to allow measurements up to 500° C. The results of the tests for each polymer are set forth in Table IV.

TABLE IV

| Sample | Mole Ratio Ad/Az | Gehman Tg (° C) | Temp. (° C) where Gehman modulus = $10^7$ dynes/cm$^2$ | Max. Melt (° C) by* DTA | Decomposition begins at (° C) by DTA | ΔTemp. (° C) Melt-Dec. |
|---|---|---|---|---|---|---|
| 3a | 100/0 | 183° | dec. | 326 | 315° | + 11° |
| 3b | 75/25 | 143° | 325° | 305 | 315° | − 10° |
| 3c | 50/50 | 136° | 305° | 283 | 320° | − 37° |
| 3d | 25/75 | 122° | 276° | 277 | 320° | − 43° |
| 3e | 0/100 | 122° | 295 | 288 | 325° | − 37° |

*Averages of a number of readings

The data of Table IV shows that both Runs 3c and 3d, prepared in accordance with the present invention, are easily melt processable. Runs 3d shows a eutectic point both for polymer melt temperature, and the temperature at which the shear modulus is $10^7$ dynes/cm$^2$. Generally speaking, this latter temperature measurement is taken as a guide for determining ease of polymer extrudability, or injection moldability, and preferably should be below the polymer decomposition temperature to ensure polymer processability.

Runs 3a, and 3b not prepared in accordance with the present invention, display polymer melt temperatures, or $10^7$ dynes/cm$^2$ modulii points either above, or close or their decomposition points which precludes their polymer melt processing. Run 3e, also not prepared in accordance with the invention is the brittle homopolymer.

EXAMPLES 4–7

Using the apparatus and procedure of Example 2 and the ingredients and proportions set forth therein, except the azelaoyl chloride is replaced by the acid chlorides set forth in Table V, there are produced the following copolyamides in accordance with the present invention

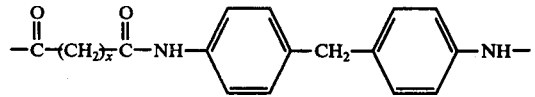

wherein the values and proportions of x are set forth in Table V.

TABLE V

| | Acid chloride mixture | Value of x in the % of the recurring unit |
|---|---|---|
| Ex. 4 | adipoyl chloride (0.2 mole) | 25% = 4 |
| | suberoyl chloride (0.6 mole) | 75% = 6 |
| Ex. 5 | adipoyl chloride (0.2 mole) | 25% = 4 |
| | sebacoyl chloride (0.6 mole) | 75% = 8 |
| Ex. 6 | adipoyl chloride (0.2 mole) | 25% = 4 |
| | undecanedioyl chloride (0.6 mole) | 75% = 9 |
| Ex. 7 | adipoyl chloride (0.2 mole) | 25% = 4 |
| | dodecanedioyl chloride (0.6 mole) | 75% = 10 |

EXAMPLES 8–10

Using the apparatus and procedure of Example 2 and the ingredients and proportions set forth therein, except that the 4,4'-methylenedianiline is replaced by the arylene diamines set forth in Table VI, there are produced the following copolyamides in accordance with the present invention.

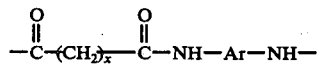

wherein x in 75 percent of recurring units is 7 and in the remaining 25 percent is 4 and Ar has the significance set forth in Table VI.

TABLE VI

| | Arylene Diamine | Ar Unit |
|---|---|---|
| Ex. 8 | para-pheneylene-diamine | |
| Ex. 9 | 4,4'-diaminodiphenyl-ether | |
| Ex. 10 | 3,3'-methylenedianiline | |

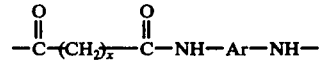

We claim:

1. A fiber forming injection moldable copolyamide consisting essentially of the recurring unit.

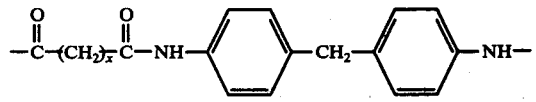

wherein x in 50 percent to 85 percent of the recurring units represents an integer from 6 to 10, inclusive, and in 15 percent to 50 percent of the recurring units x is 4, and Ar is 4,4'-methylenediphenylene.

2. A copolyamide according to claim 1 wherein x in 50 percent to 85 percent of the recurring units is 7 and in the remaining 15 to 50 percent of the recurring units x is 4.

3. A fiber forming copolyamide consisting essentially of the recurring unit

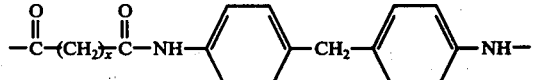

wherein x in about 70 percent to about 80 percent of the recurring units represents an integer from 6 to 10, inclusive, and in about 20 percent to about 30 percent of the recurring units x is 4.

4. A copolyamide according to claim 3 wherein x in about 70 percent to about 80 percent of the recurring units is 7 and in the remaining 20 to 30 percent of the recurring units x is 4.

5. A copolyamide according to claim 3 wherein x in about 75 percent of the recurring units represents an integer from 6 to 10, inclusive, and in the remaining 25 percent x is 4.

6. A fiber forming copolyamide consisting essentially of the recurring unit wherein x in about 75 percent of the recurring units is 7 and in the remaining 25 percent x is 4.

7. A copolyamide composition according to claim 1 containing a fibrous reinforcing agent.

* * * * *